(12) United States Patent
Kubo

(10) Patent No.: US 11,293,604 B2
(45) Date of Patent: Apr. 5, 2022

(54) LED LIGHT SOURCE MECHANISM, TELEPHONE SET, AND METHOD FOR FORMING LED LIGHT SOURCE

(71) Applicant: NEC Platforms, Ltd., Kawasaki (JP)

(72) Inventor: Kyota Kubo, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/772,049

(22) PCT Filed: Feb. 7, 2020

(86) PCT No.: PCT/JP2020/004859
§ 371 (c)(1),
(2) Date: Jun. 11, 2020

(87) PCT Pub. No.: WO2020/195234
PCT Pub. Date: Oct. 1, 2020

(65) Prior Publication Data
US 2022/0003363 A1 Jan. 6, 2022

(30) Foreign Application Priority Data
Mar. 26, 2019 (JP) .............................. JP2019-058453

(51) Int. Cl.
F21V 7/04 (2006.01)
F21K 9/68 (2016.01)
(Continued)

(52) U.S. Cl.
CPC ................ F21K 9/68 (2016.08); F21V 7/041 (2013.01); F21V 33/0056 (2013.01); H04M 1/22 (2013.01); F21Y 2115/10 (2016.08)

(58) Field of Classification Search
None
See application file for complete search history.

(56) References Cited

U.S. PATENT DOCUMENTS

| 7,956,371 B2 | 6/2011 | Denbaars et al. |
| 2008/0192355 A1 | 8/2008 | Yokota et al. |
| 2017/0357046 A1 | 12/2017 | Preston et al. |

FOREIGN PATENT DOCUMENTS

| CN | 1879228 A | 12/2006 |
| CN | 101900277 A | 12/2010 |

(Continued)

OTHER PUBLICATIONS

EP Search Report for EP Application No. EP20729604.7 dated Feb. 19, 2021.

(Continued)

Primary Examiner — Elmito Breval
(74) Attorney, Agent, or Firm — Sughrue Mion, PLLC

(57) ABSTRACT

One LED is used as an LED light source mechanism that illuminates an illumination surface, the illumination surface being laterally long and wide in a left/right direction, in which a central axis of the LED is disposed at a position on a center line vertically extending from a central part in the left-right direction of the illumination surface in such a manner that the LED faces the illumination surface, and two reflection surfaces are formed in a conical shape on a reflection surface forming place so as to surround the illumination surface, a light guide part, and the LED, and a center line of the conical shape is disposed on the central axis of the LED, the two reflection surfaces being configured to reflect light that is emitted from the LED toward an outside of the illumination surface.

15 Claims, 14 Drawing Sheets

(51) Int. Cl.
*F21V 33/00* (2006.01)
*H04M 1/22* (2006.01)
*F21Y 115/10* (2016.01)

(56) References Cited

FOREIGN PATENT DOCUMENTS

| | | |
|---|---|---|
| CN | 102734673 A | 10/2012 |
| CN | 104279507 A | 1/2015 |
| DE | 202019100959 U1 | 4/2019 |
| EP | 2503578 A1 | 9/2012 |
| JP | 2002-198567 A | 7/2002 |
| JP | 2004-200093 A | 7/2004 |
| JP | 2004-235736 A | 8/2004 |
| JP | 2008-11356 A | 1/2008 |
| JP | 2008-225112 A | 9/2008 |
| JP | 2012-234650 A | 11/2012 |

OTHER PUBLICATIONS

Chinese Office Action for CN Application No. 202080000940.4 dated Jul. 13, 2021 with English Translation.
Office Action issued from Japanese Patent Application No. 2019-058453 dated Nov. 19, 2019.
International Search Report for PCT/JP2020/004859 dated Mar. 10, 2020 (PCT/ISA/210).

LED LIGHT SOURCE MECHANISM, TELEPHONE SET, AND METHOD FOR FORMING LED LIGHT SOURCE

CROSS REFERENCE TO RELATED APPLICATIONS

This application is a National Stage of International Application No. PCT/JP2020/004859 filed Feb. 7, 2020, claiming priority based on Japanese Patent Application No. 2019-058453 filed Mar. 26, 2019, the disclosure of which is incorporated herein in its entirety by reference.

TECHNICAL FIELD

The present disclosure relates to an LED (Light Emitting Diode) light source mechanism, a telephone set, and a method for forming an LED light source. In particular, the present disclosure relates to an LED light source mechanism, a telephone set, and a method for forming an LED light source, capable of illuminating a wide range without causing unevenness in the illumination even when only one LED is used as a light source.

BACKGROUND ART

Operation buttons (i.e., operation keys) and indicator lamps for user interfaces as well as a handset are disposed on the surface of the housing of a telephone set. As an example of a telephone set, a key telephone like one disclosed in Japanese Unexamined Patent Application Publication No. 2004-235736 "Key Telephone Set and Key Telephone System" is described. FIG. 6 is a perspective view showing its external appearance. FIG. 6 is a perspective view showing an example of an external appearance of a key telephone set in the present state.

As shown in FIG. 6, in a key telephone set 100B, a telephone set main body 200B is connected to a handset 300 through a spiral cable 310. Further, a main unit that performs the overall control of the key telephone system (not shown) is connected to the telephone set main body 200B through a line cable 210.

A display unit 110B, a line button unit 120, a dial unit 130, a loudspeaker 140, and a microphone 150 are arranged on the upper surface and the side surfaces of the telephone set main body 200B. The display unit 110B includes an incoming-call lamp 14 for visually displaying an incoming-call state, and a liquid-crystal panel 19 for displaying a communication state of the key telephone set 100B and various button operation states. Further, the line button unit 120 includes a plurality of line buttons 21 for selecting an extension line and an outside line. Further, the dial unit 130 includes a plurality of dial buttons 31 and a plurality of function buttons 32.

SUMMARY OF INVENTION

However, in the present-state art related to the present disclosure, the incoming-call lamp 14 provided in the display unit 110B is usually disposed at the right shoulder of the telephone set main body 200B as shown in FIG. 6. As a result, in the above-described position of the incoming-call lamp 14, its visibility is insufficient. Therefore, a user may not be able to see the incoming-call lamp 14 because he/she is distracted therefrom by a button operation task or what is displayed on the screen of the liquid-crystal panel 19, or because the incoming-call lamp 14 is hidden behind documents placed on a desk. Therefore, even if an incoming call occurs and the incoming-call lamp 14 is lighted, the user may not be able to recognize the incoming call.

Therefore, in order to improve the visibility by a user, it is desirable that a laterally-long and wide area in the upper area of the display unit 110B of the telephone set main body 200B be illuminated in a diffused manner, instead of illuminating only the right shoulder part as in the case of the incoming-call lamp 14 shown in FIG. 6. However, regarding the cost, it is desirable that the number of LEDs (Laser Emitting Diodes) that serve as the light source for the laterally-long diffused illumination not be increased, i.e., be only one. Further, it is desirable to provide a light source mechanism that can uniformly illuminate an illumination surface in both the left and right directions by moving the position of the one LED and thereby disposing it at the center of the upper area of the display unit 110B, instead of disposing it in the right shoulder thereof, and diffusing light emitted from the LED in both the left and right directions (the lateral direction) of the upper area in a light guide part (a lens part) that guides the light from the LED to the illumination surface.

However, in the present-state art related to the present disclosure, even if the light emitted from the one LED, which serves as the light source, is diffused in both the left and right directions of the upper area of the display unit 110B of the telephone set body 200B in the state where the LED is disposed at or near the center of the upper area thereof, the light lays are concentrated at the center where the LED is located and hence the light cannot be sufficiently diffused to both the left and right ends, thus causing unevenness in the illumination on the illumination surface. This situation cannot be improved even when a material containing a diffusing agent for diffusing light is used as the material for the light guide part and the illumination surface.

FIGS. 7A and 7B are schematic drawings showing an internal structure of an LED light source mechanism when an LED serving as a light source is disposed at the central position of the upper area of the display unit 110B of the key telephone set 100B shown in FIG. 6, and show a case where an illumination surface is formed in the lateral direction of the upper area of the display unit 110B of the key telephone set 100B, i.e., in both the left and right directions of the upper area from the central position thereof. Note that FIG. 7A is a perspective view showing a structure of an LED light source mechanism 50B located in the upper area of the telephone set main body 200B as viewed obliquely from the front in the perspective view shown in FIG. 6, in which the inside of the telephone set main body 200B is shown in a perspective manner. Further, FIG. 7B is a perspective view showing an internal structure forming the LED light source mechanism 50B shown in FIG. 7A as viewed from the top.

As shown in the LED light source mechanism 50B shown in FIG. 7B, directly below an illumination surface 11B formed in the upper area of the display unit 110B of the telephone set main body 200B, i.e., at the central position in the left/right direction of the illumination surface 11B (the position directly below the central part 1), an LED 10, which serves as the light source is disposed with a light guide part (a lens part that leads light to the illumination surface 11B) interposed therebetween so that the LED 10 is opposed to the illumination surface 11B. Further, a reflection surface 12B for reflecting light from the LED 10 and thereby guiding the light in the direction toward the illumination surface 11B is formed so as to surround the illumination surface 11B, the LED 10, and the light guiding part. Further, the illumination surface 11B has a planar shape that is laterally long in both the right and left directions, and the reflection surface 12B has a planar shape that is inclined in a stepwise manner according to the distance from the end of the illumination surface 11B so that light emitted from the LED 10 is refracted and reflected in the direction toward the illumination surface 11B. Note that as shown in FIG. 7B, it is assumed that both ends, i.e., the left end 1a and the right end 1b of the illumination surface 11B are located on an extension line that is inclined from the central axis (the central line) of the LED 10 by an angle of 40° in the left/right direction.

Note that in the present-state art, in order to form the illumination surface 11B and the light guide part in an integrated manner, while applying two-color molding, a transparent material containing a diffusing agent for diffusing light is usually used for the light guide part (the lens part), and a diffusing-agent material made of a resin containing a diffusing agent, such as PMMA (Poly Methyl Methacrylate) containing a diffusing agent is used for the illumination surface 11B (the lighting part). Further, the reflection surface 12B is formed by using a PC (Poly Carbonate) having a light shielding property and high reflection efficiency on the side surfaces of the illumination surface 11B and the light guide part (the lens part).

A result of quantitative evaluations for light lays in the LED light source mechanism 50B having the above-described structure will be described with reference to FIG. 8. FIG. 8 is a schematic drawing showing a result of ray tracing of the LED light source mechanism 50B in the present-state art shown in FIGS. 7A and 7B, and shows a result of a ray tracing method based on Snell's law. Note that in FIG. 8, the light-lay emitting state of the illumination surface 11B and the light guiding part is left-right symmetrical, so that only the left half of the light-ray emitting state is schematically shown while omitting the right half thereof.

As shown in the result of the ray tracing shown in FIG. 8, even when a diffusing agent is used for the illumination surface 11B and the light guide part, the amount of light rays that are emitted from the LED 10 and reach the illumination surface 11B in the left end 1a of the illumination surface 11B is about half (the number of light rays in the left half in the result of the evaluation experiment shown in FIG. 8 is three) of the amount of light rays in the central part 1 thereof which is located in the place opposed to the LED 10 (the number of light rays in the left half in the result of the evaluation experiment shown in FIG. 8 is six). That is, while the central part 1 of the illumination surface 11B is strongly illuminated, both ends, i.e., the left and right ends 1a and 1b thereof are weakly illuminated, thus causing unevenness in the illumination. Note that as described above, the case where both ends, i.e., the left and right ends 1a and 1b of the illumination surface 11B are positioned in the directions of the angles of 40° from the central axis (the central line) of the LED 10 in the left/right direction as viewed from the LED 10 is shown.

That is, in the present-state LED light source mechanism 50B, as shown in FIGS. 7A and 7B, the reflection surface 12B has the planar shape and the light incident on the reflection surface 12B is reflected onto the two-dimensional plane. As a result, there is the following problem to be solved. That is, although the reflected light easily reaches the central part 1 of the illumination surface 11B, the light lays that reach both ends, i.e., the left and right ends 1a and 1b of the illumination surface 11B are reduced. Further, there is also the following problem to be solved. That is, since the illumination surface 11B and the light guide part are formed by using a material containing an expanding agent, the cost is increased. In addition, when the illumination surface 11B is illuminated, it is illuminated in a whitish somber color. That is, it is impossible to illuminate the illumination surface 11B in a clear and bright illuminated state.

Object of the Present Disclosure

In view of the above-described problems, an object of the present disclosure is to provide an LED light source mechanism, a telephone set, and a method for forming an LED light source, capable of illuminating a wide range without causing unevenness in the illumination even when only one LED is used as a light source.

In order to solve the above-described problems, an LED light source mechanism, a telephone set, and a method for forming an LED light source according to the present disclosure mainly adopt characteristic configurations described below.

(1) An LED light source mechanism according to the present disclosure is an LED light source mechanism configured to use one LED (Light Emitting Diode) as a light source and illuminate an illumination surface, the illumination surface being laterally long and wide in a left/right direction, in which, a central axis of the LED is disposed at a position on a center line vertically extending from a central part in the left-right direction of the illumination surface in such a manner that the LED faces the illumination surface, the LED light source mechanism has two reflection surfaces that are formed in a conical shape, the two reflection surfaces being configured to reflect light that is emitted from the LED toward an outside of the illumination surface, a center line of the conical shape is disposed on the central axis of the LED, the two reflection surfaces are:

a first reflection surface having a conical shape and configured to reflect light from the LED on an outer-surface side thereof; and a second reflection surface having a truncated-conical shape, the second reflection surface including openings for light on both upper and lower surfaces thereof and configured to reflect light from the LED on an inner-surface side thereof, and an inner-surface side of the first reflection surface and the inner-surface side of the second reflection surface are disposed to be opposed to each other around the central axis of the LED.

(2) A telephone set according to the present disclosure is a telephone set including laterally long incoming-call illumination panel configured to be illuminated when a telephone call is received, in which the incoming-call illumination panel is formed by the LED light source mechanism described in the above-described item (1).

(3) A method for forming an LED light source according to the present disclosure is a method for forming an LED light source, the LED light source being configured to use one LED (Light Emitting Diode) as a light source and illuminate an illumination surface, the illumination surface being laterally long and wide in a left/right direction, in which, a central axis of the LED is disposed at a position on a center line vertically extending from a central part in the left-right direction of the illumination surface in such a manner that the LED faces the illumination surface, the LED light source mechanism has two reflection surfaces that are formed in a conical shape, the two reflection surfaces being configured to reflect light that is emitted from the LED toward an outside of the illumination surface, a center line of the conical shape is disposed on the central axis of the LED, the two reflection surfaces are:

a first reflection surface having a conical shape and configured to reflect light from the LED on an outer-surface side thereof; and a second reflection surface having a truncated-conical shape, the second reflection surface including openings for light on both upper and lower surfaces thereof and configured to reflect light from the LED on an inner-surface side thereof, and an inner-surface side of the first reflection surface and the inner-surface side of the second reflection surface are disposed to be opposed to each other around the central axis of the LED.

According to the LED light source mechanism, the telephone set, and the method for forming an LED light source in accordance with the present disclosure, the following effects can be mainly achieved.

That is, by forming the reflection surfaces in a conical shape, even if the laterally long and wide illumination surface is illuminated by one LED, light emitted from the LED can be diffused in the three-dimensional directions. Therefore, it is possible to uniformly illuminate the laterally long and wide illumination surface with a sufficient amount of light from the central part of the illumination surface to both the left and right ends thereof without causing unevenness in the illumination. Therefore, since there is no need to use a diffusing agent for the illumination surface and the light guide part, it is also possible to reduce the cost.

DESCRIPTION OF EMBODIMENTS

Figure 1:
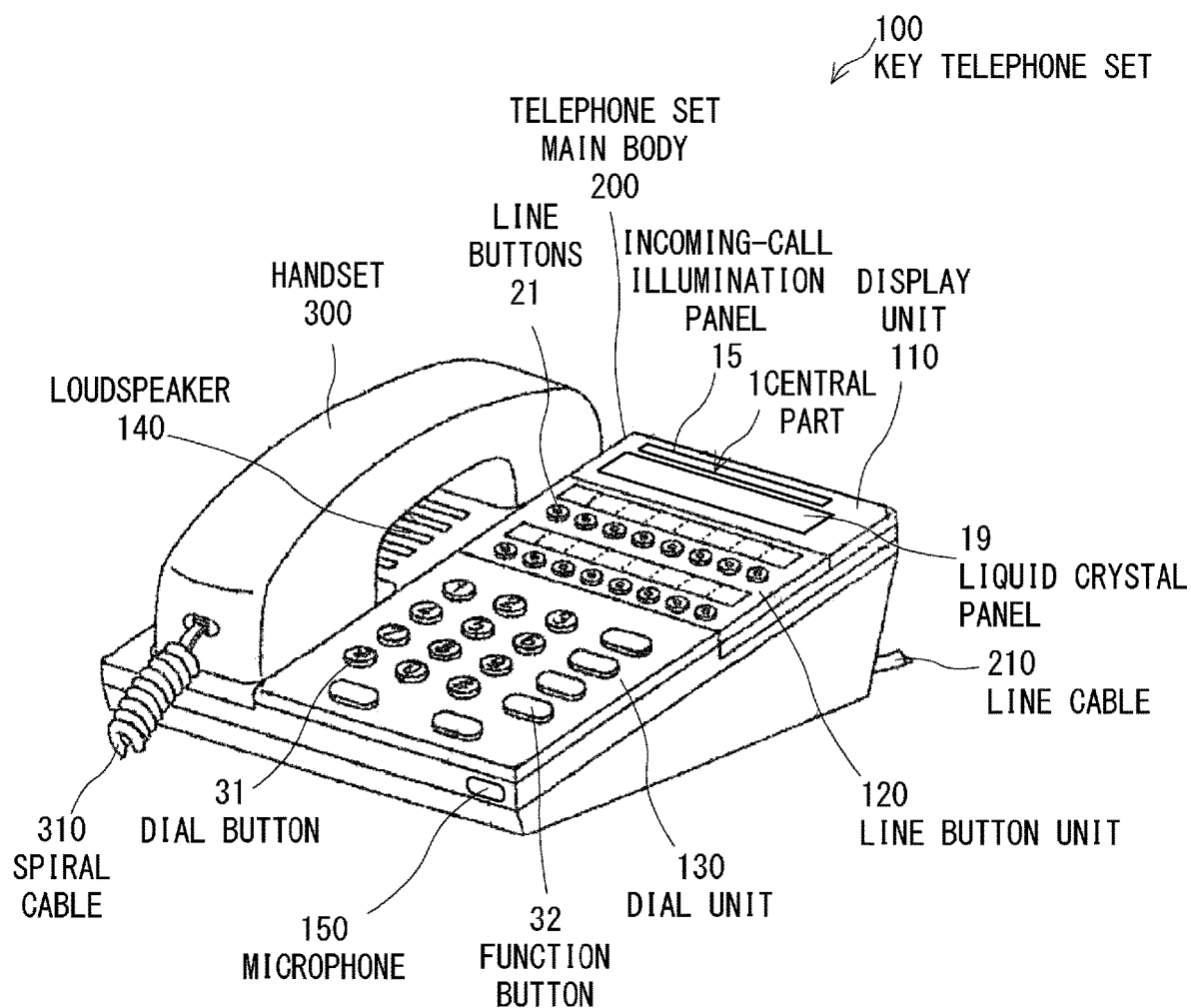
FIG. 1 is a perspective view showing an example of an external appearance of a key telephone set which is an example of a telephone set according to this example embodiment.

Preferred example embodiments of a LED light source mechanism, a telephone set, and a method for forming an LED light source according to the present disclosure will be described hereinafter with reference to the attached drawings. Further, reference symbols added in each of the drawings are added for respective components for the sake of convenience as examples for assisting the understanding thereof. That is, needless to say, they are not added with the intention of limiting the present disclosure to the example embodiments shown in the drawings.

(Features of the Present Disclosure)

Prior to explaining an example embodiment according to the present disclosure, an overview of features of the present disclosure is described hereinafter. A main feature of the present disclosure is to make it possible, by using one LED as a LED light source mechanism that illuminates a wide illumination surface having a laterally long shape (e.g., in the case of a telephone set, an incoming-call illumination panel having a laterally long shape for informing a user of an incoming call) and forming reflection surfaces in a conical shape, to diffuse and guide light emitted from the LED for illuminating the illumination surface in the three-dimensional directions through a light guide part. In this way, it is possible to prevent or reduce unevenness in the illumination on the illumination surface and thereby uniformly illuminate the illumination surface with sufficient brightness.

That is, in the present-state art, as described above, when a wide illumination surface having a laterally long shape is illuminated by one LED, although the central part of the illumination surface located on the central axis of the LED is strongly illuminated, both the left and right ends of the illumination surface are weakly illuminated, thus causing unevenness in the illumination. In contrast to this, the main feature of the present disclosure is to make it possible to strongly illuminate not only the central part of the illumination surface located on the central axis of the LED but also both the left and right ends of the illumination surface even when the illumination surface is a wide illumination surface having a laterally long shape (i.e., is an illumination panel) and thereby to uniformly illuminate the entire illumination surface. Further, in the present disclosure, since there is no need to use a material containing a diffusing agent for diffusing light over the illumination surface and the light guide part, the cost can be reduced.

(Example of Configuration of Example Embodiment)

Figure 6:
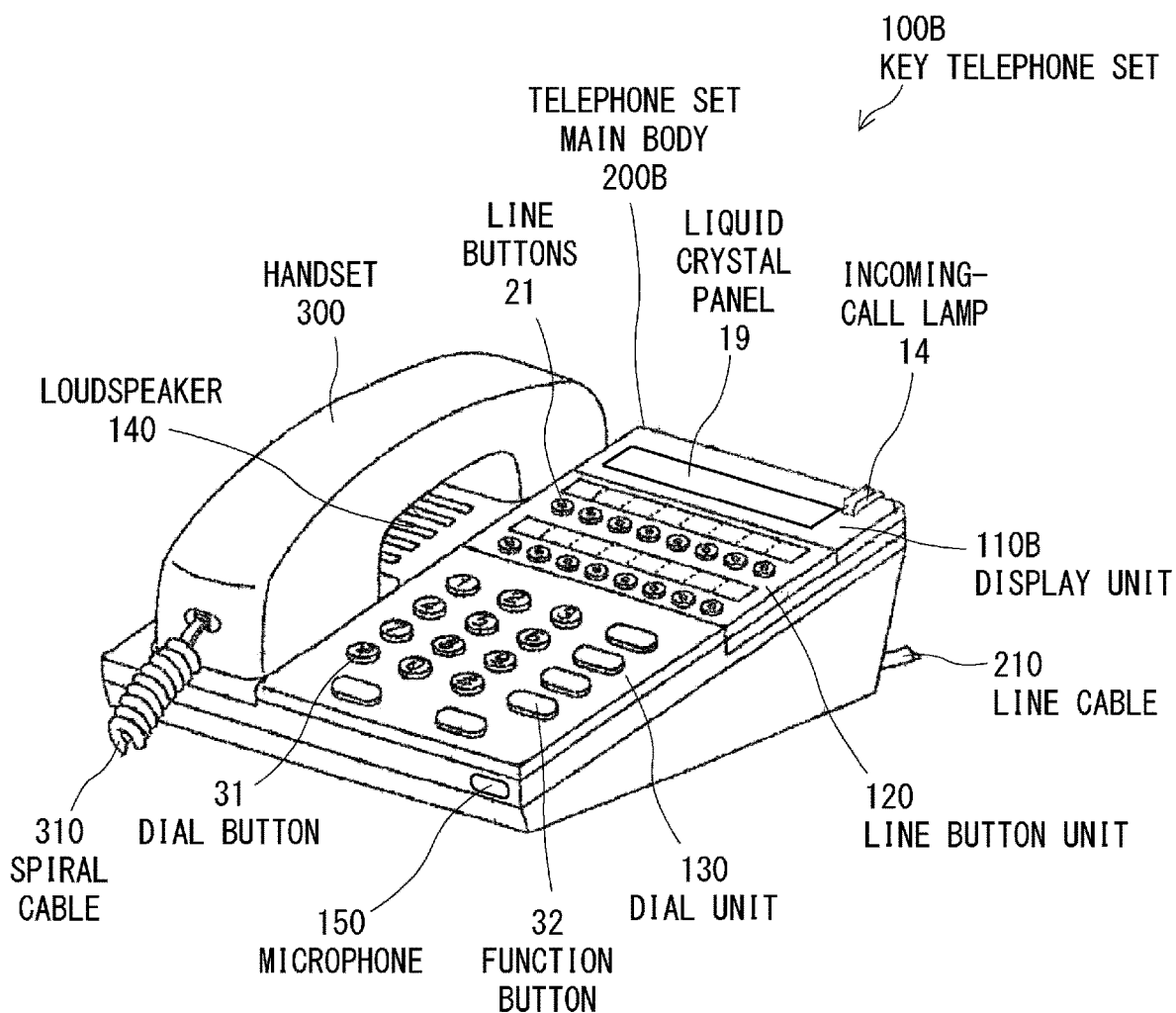
FIG. 6 is a perspective view showing an example of an external appearance of a key telephone set in present-state art.
Figure 7A:
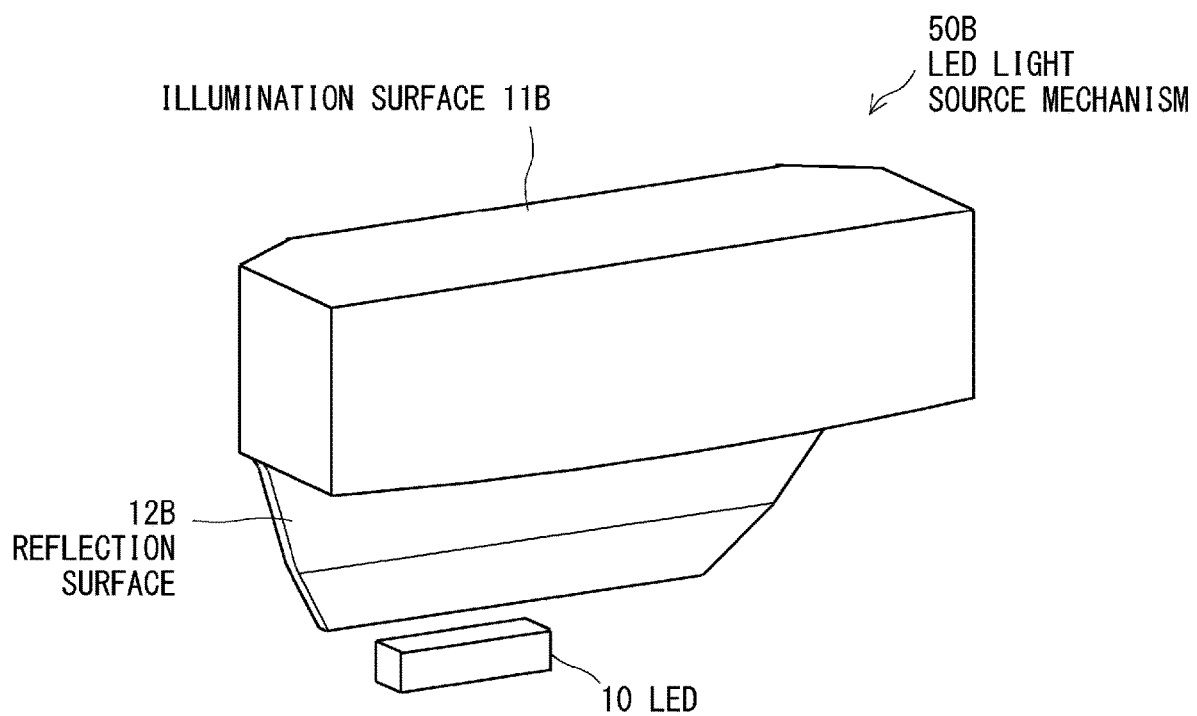
FIG. 7A is a schematic drawing showing an internal structure of an LED light source mechanism in a case where an LED serving as a light source is disposed at a central position in an upper area of a display unit of the key telephone set shown in FIG. 6.
Figure 7B:
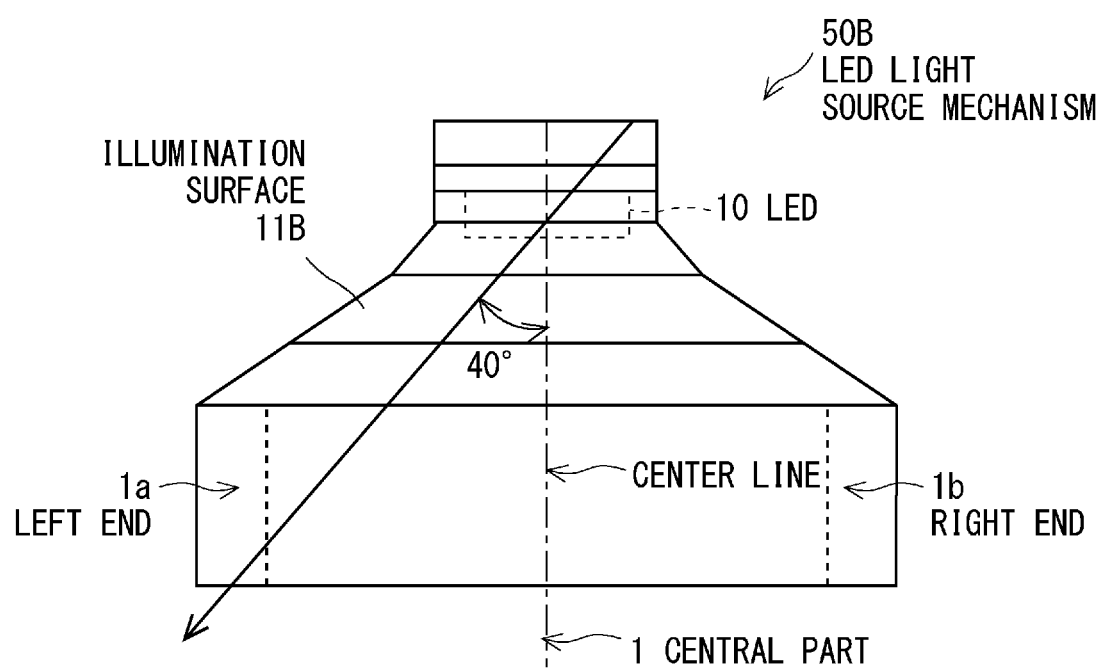
FIG. 7B is a schematic drawing showing the internal structure of the LED light source mechanism in the case where the LED serving as the light source is disposed at the central position in the upper area of the display unit of the key telephone set shown in FIG. 6.
Figure 8:
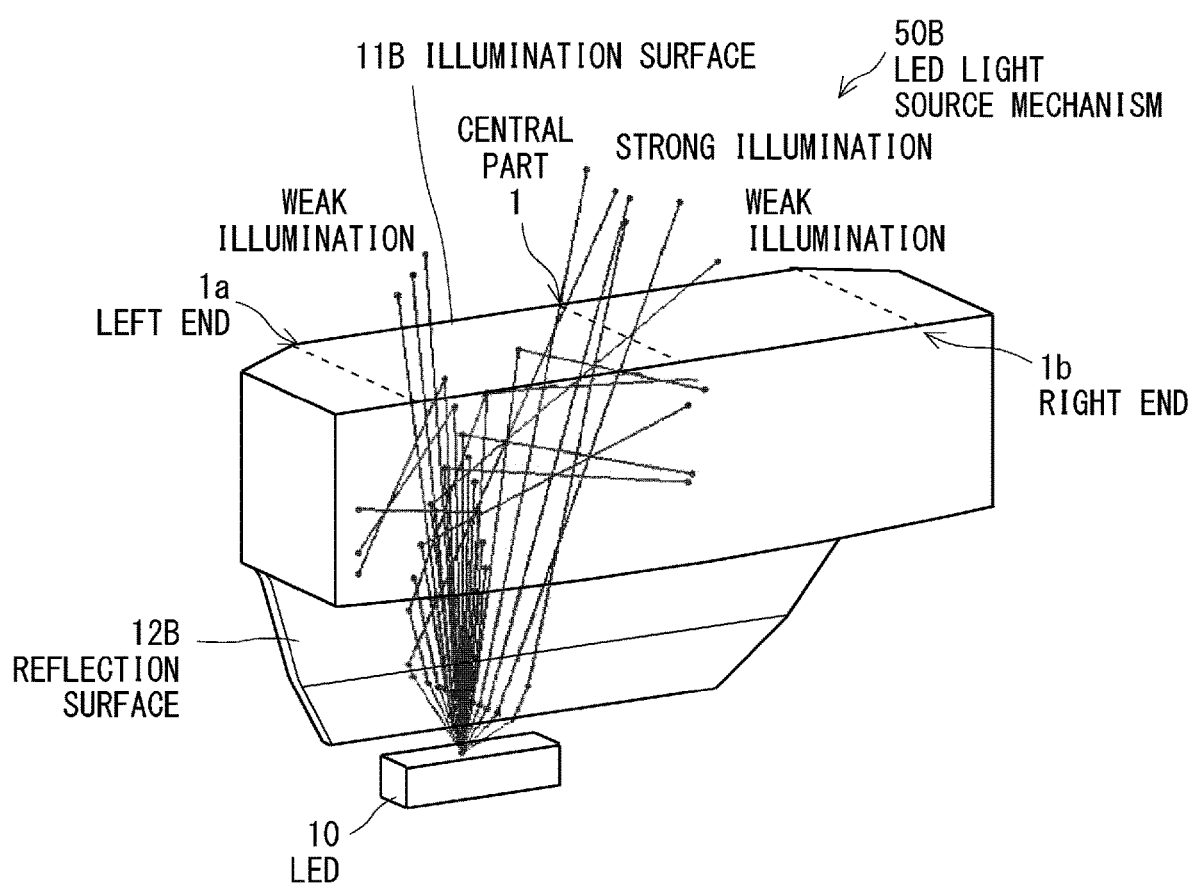
FIG. 8 is a schematic drawing showing a result of ray tracing of the LED light source mechanism in the present-state art shown in FIGS. 7A and 7B.

Next, as a specific example of a configuration of a LED light source mechanism according to this example embodiment, firstly, an example of a configuration of a key telephone set that illuminates a wide area having a laterally long shape, instead of illuminating the incoming-call lamp 14 in the key telephone set described above as the present-state art with reference to FIG. 6. FIG. 1 is a perspective view showing an example of an external appearance of a key telephone set which is an example of the telephone set according to this example embodiment.

A key telephone set 100 shown in FIG. 1, which is shown as an example of the telephone set according to this example embodiment, is one in which an incoming illumination panel 15 having a laterally long shape in the left/right direction is disposed in an upper surface area of a display unit 110 of a telephone set main body 200 instead of disposing the incoming-call lamp 14 on the right shoulder of the display unit 110B of the telephone set main body 200B of the key telephone set 100B shown in FIG. 6. Further, components other than the incoming illumination panel 15 of the key telephone 100 shown in FIG. 1 are exactly the same as those of the key telephone 100B shown in FIG. 6. Therefore, an example of the LED light source mechanism constituting the incoming-call illumination panel 15 will be described hereinafter while omitting the descriptions of the components other than the incoming-call illumination panel 15.

As shown in FIG. 1, the incoming-call illumination panel 15 is formed in a laterally long shape that is wide in the left/right direction so as to cover substantially the entire upper area of the display unit 110 of the telephone set main body 200. Only one LED that serves as a light source for lighting, i.e., illuminating the incoming-call illumination panel 15 is disposed inside the telephone set main body 200. Further, this LED is disposed so that its central axis coincides with a center line vertically extending from the central part 1 in the left/right direction of the incoming-call illumination panel 15. Further, the left and right ends of the incoming-call illumination panel 15 are each positioned in a direction of an angle of 40° from the central axis of the LED in the left and right sides, respectively.

Figure 2A:
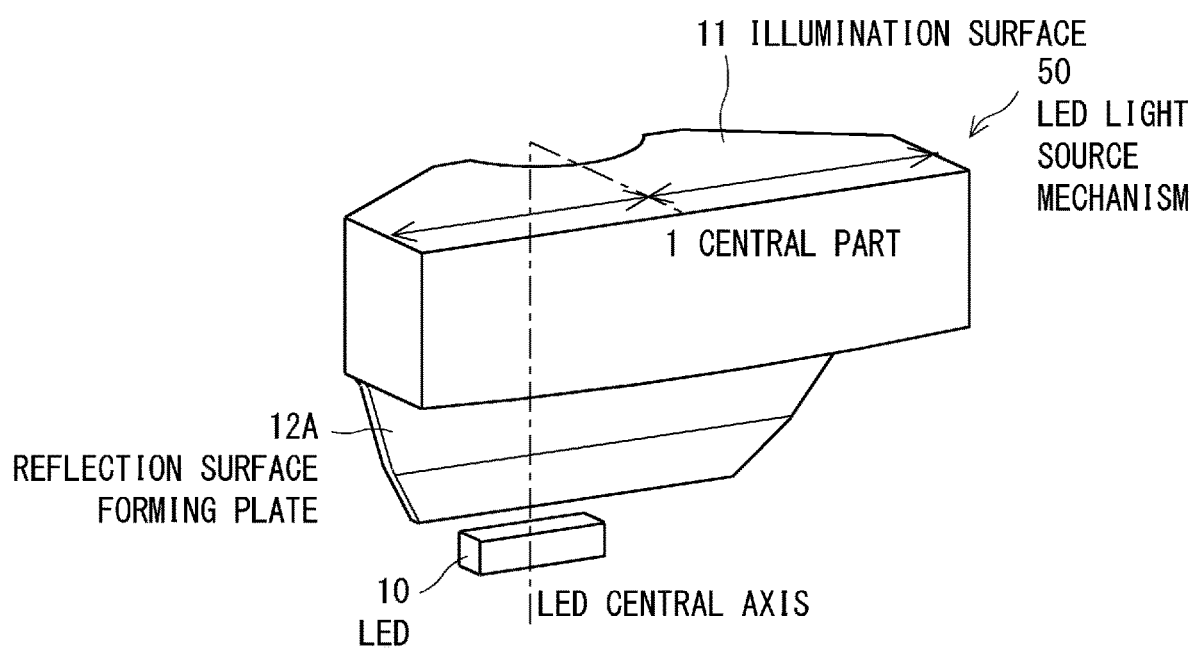
FIG. 2A is a drawing schematically showing an example of an internal structure of a LED light source mechanism according to this example embodiment, and is a perspective view showing an external appearance of an LED light source mechanism 50 located in the upper area of a telephone set main body 200 as viewed obliquely from the front in the perspective view shown in FIG. 1, in which the inside of the telephone set main body 200 is shown in a perspective manner.
Figure 2B:
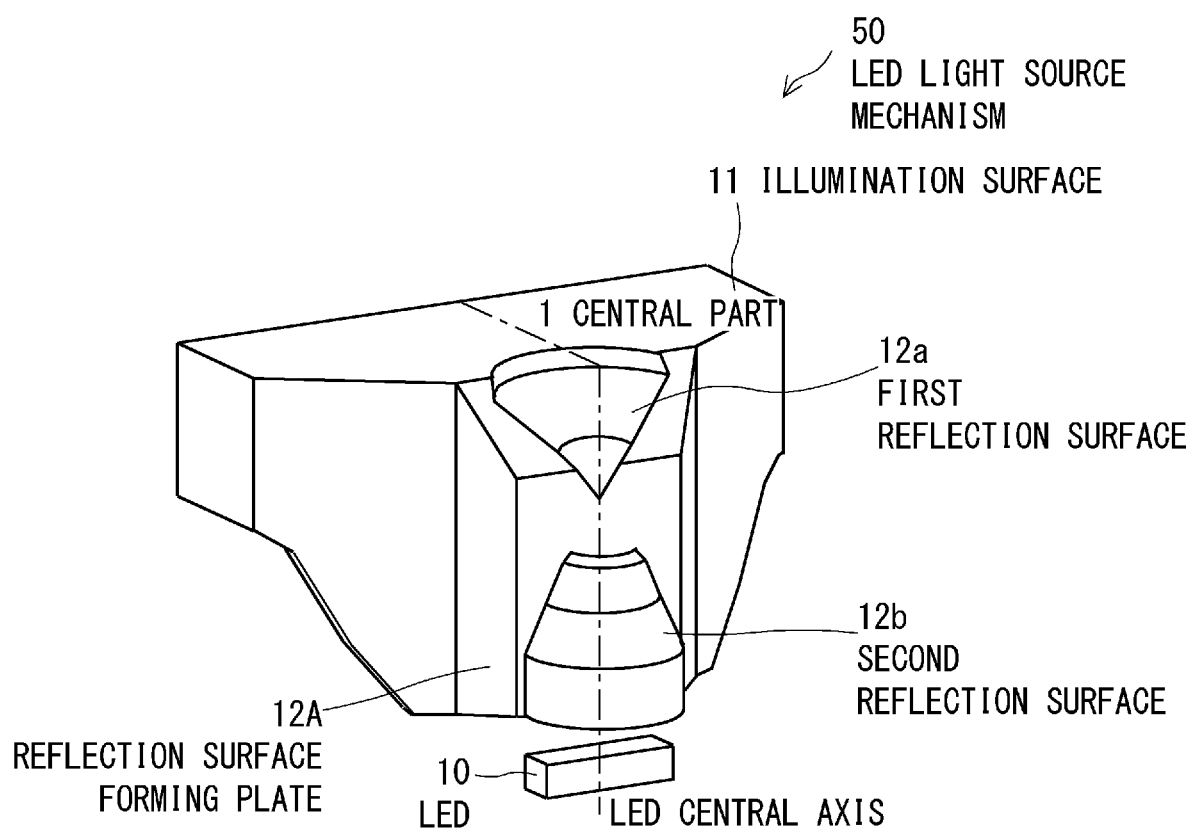
FIG. 2B is a perspective view showing an example of an internal structure of the LED light source mechanism 50 as viewed obliquely from the rear (from the rear side of the paper) in FIG. 2A in a perspective manner for explaining a conical shape of a reflection plate.
Figure 2C:
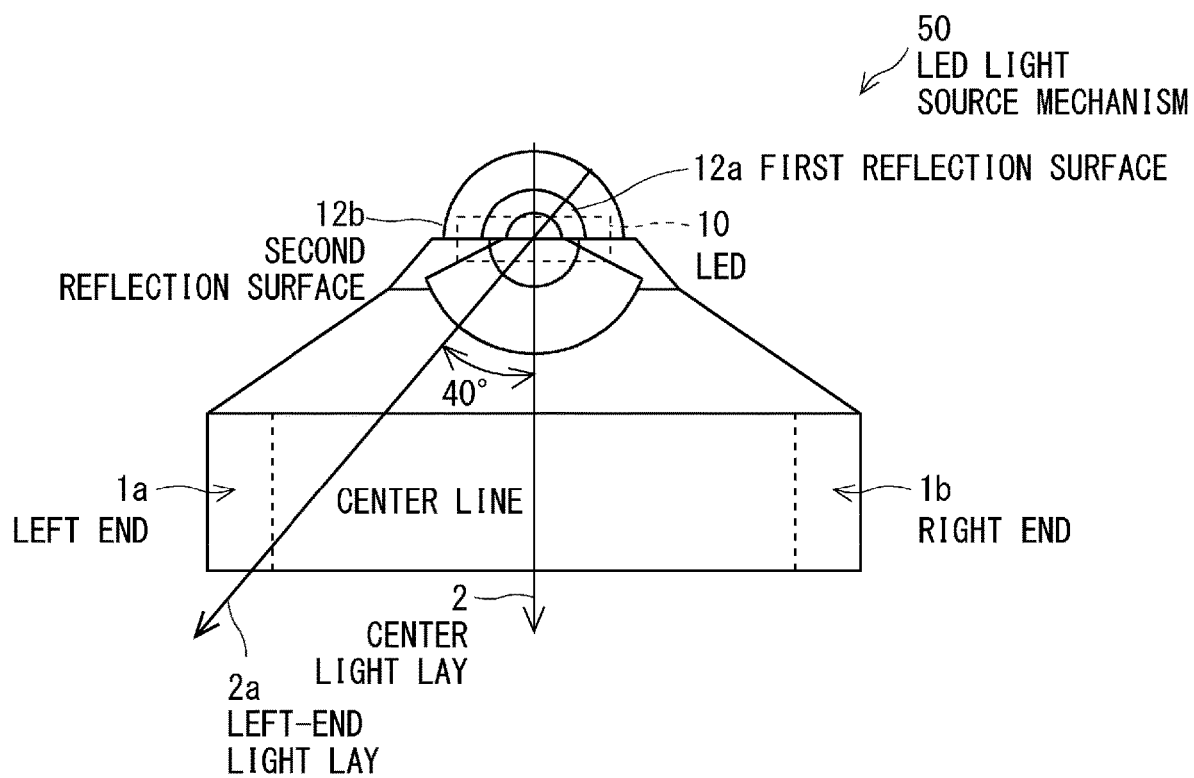
FIG. 2C is a perspective view of the internal structure of the LED light source mechanism 50 shown in FIG. 2A as viewed from the top in a perspective manner for explaining light rays emitted from the LED.

FIGS. 2A to 2C are drawings schematically showing an example of the internal structure of an LED light source mechanism according to this example embodiment. That is, an LED light source mechanism 50 shown in FIGS. 2A to 2C is an example of an LED light source function for constructing an incoming-call illumination panel 15 having a laterally long shape in the upper area of the display unit 110 of the key telephone 100 shown in FIG. 1, and shows an example of a configuration in which the central axis of an LED that serves as a light source is disposed directly below the central part in the left/right lateral direction of the illumination surface forming the incoming-call illumination panel 15.

More specifically, FIG. 2A is a perspective view showing an external appearance of an LED light source mechanism 50 located in the upper area of a telephone set main body 200 as viewed obliquely from the front in the perspective view shown in FIG. 1, in which the inside of the telephone set main body 200 is shown in a perspective manner. Further, FIG. 2B is a perspective view showing an example of an internal structure of the LED light source mechanism 50 as viewed obliquely from the rear (from the rear side of the paper) in FIG. 2A in a perspective manner for explaining a conical shape of a reflection plate. Further, FIG. 2C is a perspective view of the internal structure of the LED light source mechanism 50 shown in FIG. 2A as viewed from the top in a perspective manner for explaining light rays emitted from the LED.

As shown in the perspective view showing the external appearance of the LED light source mechanism 50 shown in FIG. 2A, the central axis of one LED 10 serving as the light source is disposed at a position on a center line vertically extending from the position where the central part in the lateral direction (i.e., the left/right direction) of the illumination surface 11 forming the incoming illumination panel 15 is located (i.e., from the center of the semicircular arc). Further, a reflection surface forming plate 12A is disposed so as to surround the illumination surface 11, the light guide part, and the LED 10. Note that as shown in FIG. 2B, reflection surfaces having a conical shape are formed in the reflection surface forming plate 12A.

Further, as shown as a center light ray 2 and a left-end light ray 2a from the LED 10 in FIG. 2C, the central axis of the LED 10 is disposed at a position on a center line vertically extending from the central part 1 in the left-right direction of the illumination surface 11 in such a manner that the LED 10 faces the illumination surface 11. Further, both ends, i.e., the left end 1a and the right end 1b of the illumination surface 11 are positioned at places in directions of angles of 40° from the central axis (the center line) of the LED 10 on the left and right sides on the illumination surface 11.

Further, as shown in the perspective view of the internal structure shown in FIG. 2B, in the LED light source mechanism 50 that illuminates the illumination surface 11, the reflection surfaces having the conical shape for reflecting light that is emitted from the LED 10 toward the outside of the incoming-call illumination panel 15, i.e., the outside of the illumination surface 11 and thereby guiding the light to the illumination surface 11 are formed in a state where the center line of the conical shape coincides with the central axis of the LED 10. Further, as the reflection surfaces having the conical shape, two reflection surfaces, i.e., a first reflection surface 12a having a conical shape and a second reflection surface having a truncated-conical shape are disposed on the reflection surface forming plate 12A, so that light emitted from the LED 10 is uniformly diffused in the three-dimensional directions more reliably.

The first reflection surface 12a is disposed so that the apex of the conical shape is oriented from the illumination surface 11 toward the LED 10, and forms a reflection surface that reflects light emitted from the LED 10 on the outer-surface side thereof. Meanwhile, the second reflection surface 12b is disposed in the opposite direction to that of the first reflection surface 12a so that the second reflection surface 12b is oriented from the LED 10 toward the illumination surface 11. Further, the second reflection surface 12b includes openings for light on both the upper and lower surfaces thereof and forms a reflection surface that reflects light emitted from the LED 10 on the inner-surface side thereof.

Note that in order to form the illumination surface 11, the light guide part (the lens part) and/or the illumination part (the illumination surface 11) may be formed by using an acrylic resin such as PMMA (Poly Methyl Methacrylate), which is often used in the present-state art, or by using any material having excellent illumination efficiency. However, unlike the present-state art, both the light guide part and the illumination surface 11 are made of a material(s) containing no diffusing agent. Further, in order to form the first and second reflection surfaces 12a and 12b on the side surfaces of the light guide part (the lens part), they may be formed by using PC (Poly Carbonate) as in the case of the present-state art, or by using any material as long as the material has a light shielding property and high reflection efficiency.

Note that in order to facilitate wide diffusion of light emitted from the LED 10 in the lateral direction (the left/right direction) of the laterally long illumination surface 11, the first reflection surface 12a is formed by stacking a plurality of layers having truncated-conical shapes having different inclination angles and one layer having a conical shape. Meanwhile, the second reflection surface 12b is formed by stacking a plurality of layers having truncated-conical shapes and having different inclination angles. Note that regarding the angle of the inclined surface having the truncated-conical shape or the conical shape in each of the layers forming the reflection surface of each of the first and second reflection surfaces 12a and 12b, it is desirable to select an optimum inclination angle at which the laterally long illumination surface 11 is uniformly illuminated without causing unevenness in the illumination state based on results of evaluations carried out by a ray tracing method based on Snell's law.

Figure 3A:
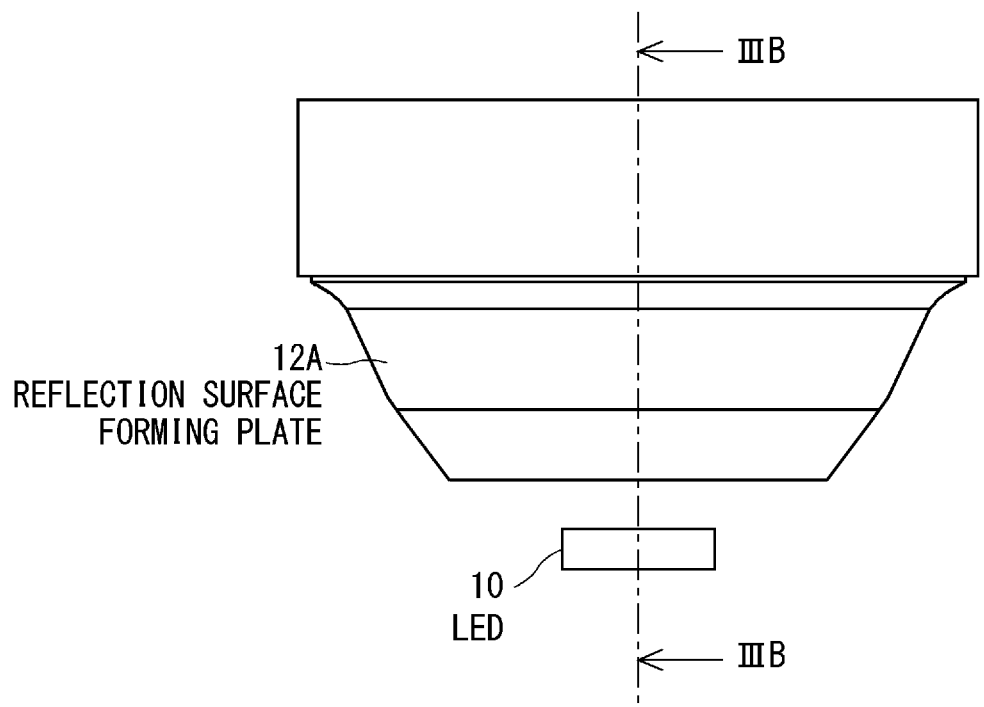
FIG. 3A is diagram for explaining an example of a method for achieving an inclination angle of each of a truncated-conical shape and a conical shape of a first reflection surface and a second reflection surface shown in FIG. 2B.
Figure 3B:
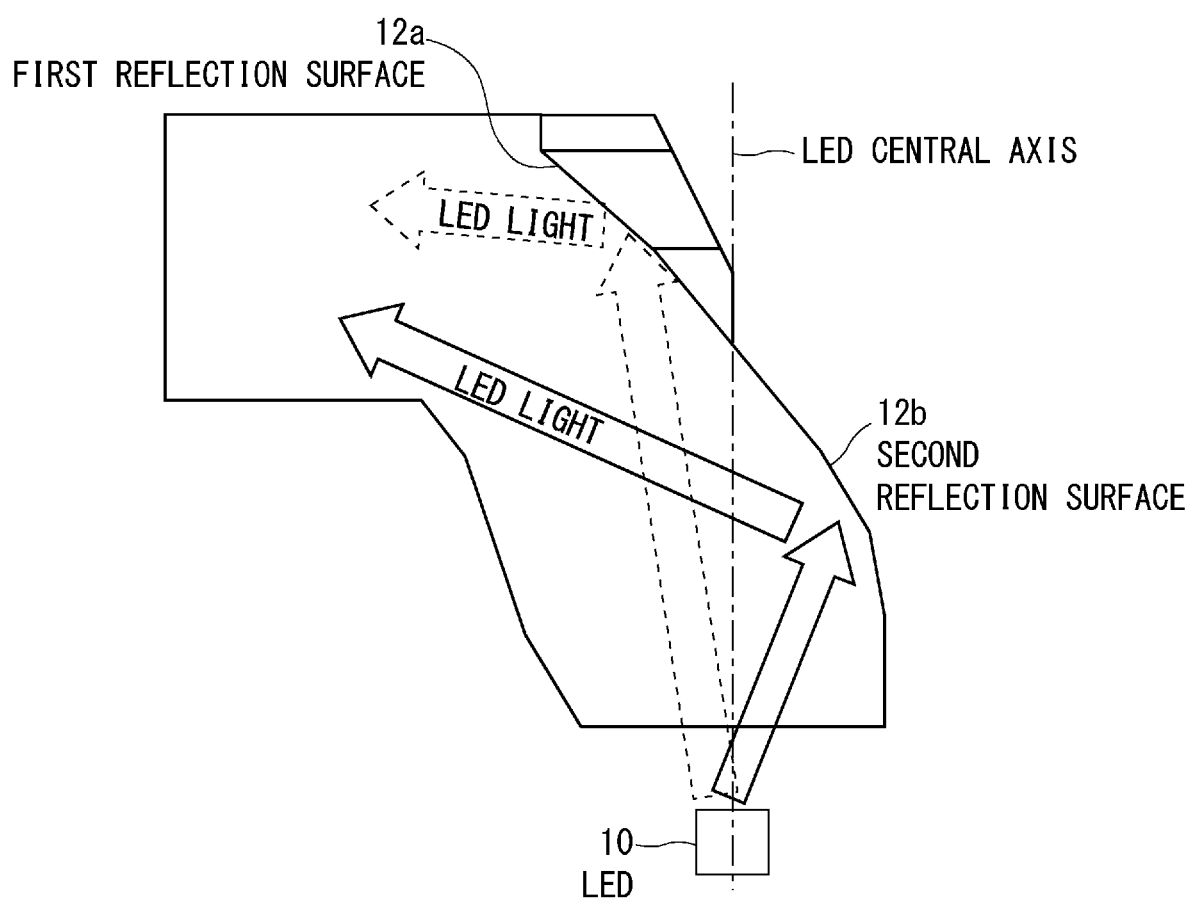
FIG. 3B is diagram for explaining the example of the method for achieving the inclination angle of each of the truncated-conical shape and the conical shape of the first reflection surface and the second reflection surface shown in FIG. 2B.

FIGS. 3A and 3B are diagrams for explaining an example of a method for determining an inclination angle of each of the truncated-conical shape and the conical shape of the first and second reflection surfaces 12a and 12b shown in FIG. 2B. FIG. 3A is a diagram showing an arrangement showing a positional relation between the reflection surface forming plate 12A and the LED 10 shown in FIGS. 2A to 2C, and FIG. 3B is a cross-sectional view showing an example of an inclination angle between the first and second reflection surfaces 12a and 12b disposed on the reflection surface forming plate 12A as viewed in a direction indicted by arrows IIIB-IIIB in FIG. 3A.

In the cross-sectional view shown in FIG. 3B, as indicated by a broken-line arrow, the reflected light, i.e., the light that is emitted from the LED 10 and reflected by the first reflection surface 12a having the conical shape is reflected at a small angle with respect to the lateral direction (the horizontal direction) and is reflected toward the left and right ends 1a and 1b of the illumination surface 11. Meanwhile, as indicated by a solid-line arrow, the reflected light reflected by the second reflection surface 12b having the truncated-conical shape is reflected at an angle larger than that of the broken-line arrow with respect to the lateral direction (the horizontal direction) and is reflected toward the inner sides of the left and right ends 1a and 1b of the illumination surface 11, i.e., toward places that are closer to the central part 1 than the left and right ends 1a and 1b are. Further, in the reflection surface formed of the conical shape and the truncated-conical shapes having mutually different inclination angles, since the light is diffused and reflected over a wide range in the three-dimensional directions (in multiple directions), the reflected light is repeatedly reflected and eventually reaches various places of the illumination surface 11.

A procedure for determining the inclined surfaces of the first and second reflection surfaces 12a and 12b will be briefly described hereinafter. Firstly, by applying a ray tracing method based on Snell's law to the inclination angle between the first and second reflection surfaces 12a and 12b in the cross section IIIB-IIIB shown in FIG. 3B, a distribution state of light rays over an angle range from the central axis of the LED shown in FIG. 3B to 40° in the left and right directions as viewed from the LED 10, i.e., a distribution state of light rays that reach the illumination surface 11 is evaluated. Then, the inclination angle of each of the first and second reflection surfaces 12a and 12b in the state where a uniform distribution state is obtained as the distribution state of light rays reaching the illumination surface 11 based on the result of the evaluation may be determined as an optimum inclination angle. After that, a locus that is obtained by rotating the central axis of the LED 10 by 360° by using the obtained optimum inclination angle may be applied as a three-dimensional shape (a conical shape or a truncated-conical shape) of the first and second reflection surfaces 12a and 12b. As a result, it is possible to make the reflected light from the first and second reflection surfaces 12a and 12b reach various places over a wide range on the illumination surface 11, and thereby to uniformly illuminate the laterally long and wide illumination surface 11 even by the light from the one LED 10.

Figure 4:
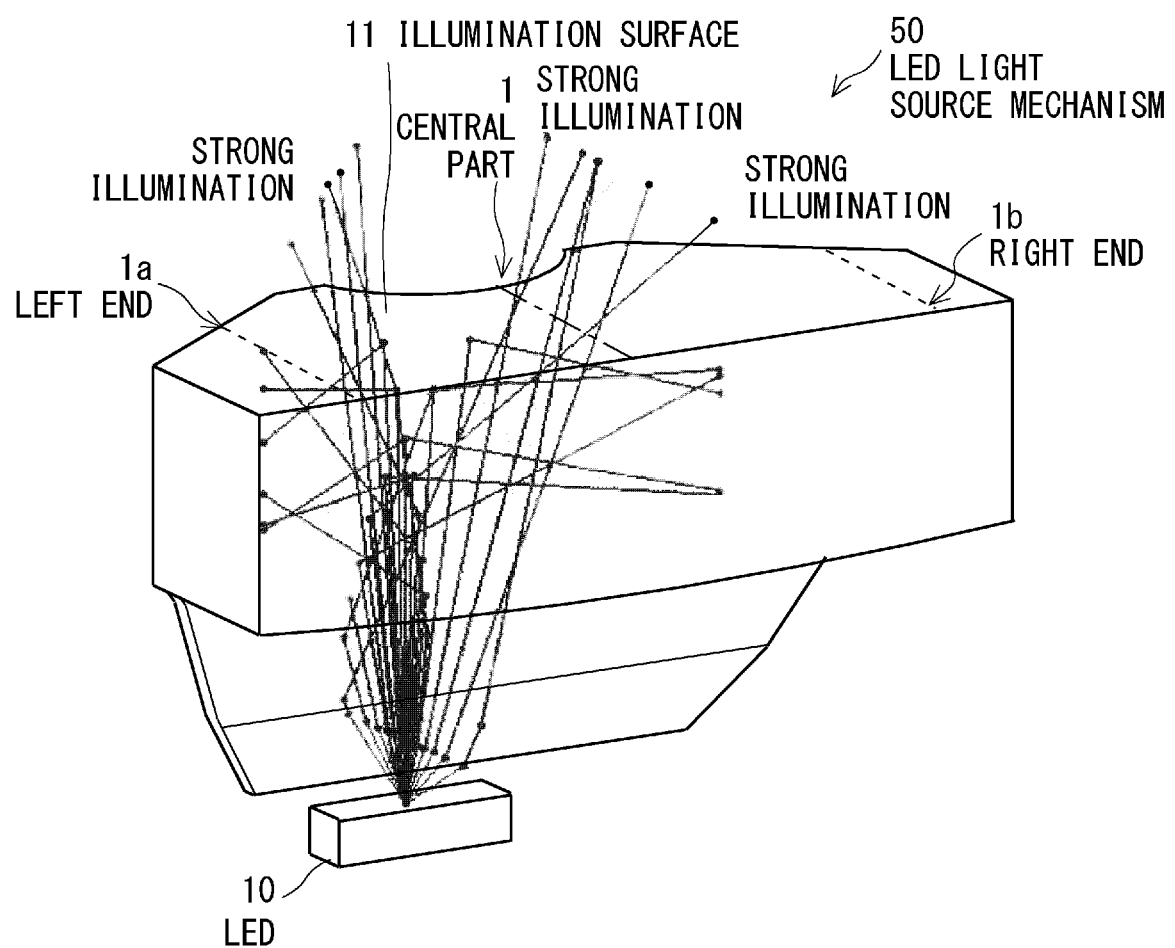
FIG. 4 is a schematic drawing showing an example of a result of ray tracing of the LED light source mechanism shown in FIGS. 2A to 2C.

FIG. 4 shows results of evaluations of the amount of light lays in the LED light source mechanism 50 shown in FIGS. 2A to 2C in the case where the inclination angle between the first and second reflection surfaces 12a and 12b is set to an optimum angle through the procedure described above with reference to FIGS. 3A and 3B. FIG. 4 is a schematic drawing showing an example of a result of ray tracing of the LED light source mechanism 50 shown in FIGS. 2A to 2C, and shows a result of a ray tracing method based on Snell's law. Note that in FIG. 4, the light-lay emitting state of the illumination surface 11 and the light guiding part is left-right symmetrical, so that only the left half of the light-lay emitting state is shown while omitting the right half thereof.

As shown in the schematic drawing shown in FIG. 4, the amount of light rays that are emitted from the LED 10 and reach the illumination surface 11 in both ends, i.e., the left and right ends 1a and 1b of the illumination surface 11, which is opposed to the LED 10, is roughly equal (the number of light rays in the left half in the result of the evaluation experiment shown in FIG. 4 is six) to the amount of light rays in the central part 1 (the number of light rays in the left half in the result of the evaluation experiment shown in FIG. 4 is six).

That is, even in the LED light source mechanism 50 in which the wide illumination surface 11 having the laterally long shape is disposed in the left/right direction and only one LED 10 is disposed at a position on the center line vertically extending from the central part 1 in the left/right direction of the illumination surface 11, since the reflected light is diffused in the three-dimensional directions by the first reflection surface 12a having the conical shape and the second reflection surface 12b having the truncated-conical shape, the illumination surface 11 can be uniformly illuminated over its entire area in a strongly-illuminated state. That is, as described above with reference to the cross-sectional view shown in FIG. 3B, the reflected light, i.e., the light that is emitted from the LED 10 and reflected by the first reflection surface 12a having the conical shape and the second reflection surface 12b having the truncated-conical shape is diffused and reflected in the three-dimensional directions (in multiple directions) on these reflection surfaces and eventually reaches various places of the illumination surface 11.

In this way, even in a state where the illumination surface 11, including the light guide part, does not contain a diffusing agent, the light emitted from the LED 10 can be diffused uniformly and widely over the entire illumination surface 11. Therefore, the central part 1 of the illumination surface 11 having the laterally long shape in the left/right direction is strongly illuminated, and the entire illumination surface 11 including both ends, i.e., the left and right ends 1a and 1b is strongly illuminated. As a result, it is possible to uniformly illuminate the illumination surface 11 without causing unevenness in the illumination and thereby to improve the visibility by a user. Further, since there is no need to use a diffusing agent, it is expected that the cost may be reduced.

(Description of Effect of Example Embodiment)

As described above in detail, the following effects are obtained in this example embodiment.

That is, even when one LED 10 is used as the light source as the LED light source mechanism 50, it is possible, by forming the reflection surfaces by the first reflection surface 12a having the conical shape and the second reflection surface 12b having the truncated-conical shape, to diffuse and reflect light emitted from the LED 10 in the three-dimensional directions. Therefore, it is possible to uniformly illuminate the laterally long and wide illumination surface 11 over a wide range from the central part of the illumination surface 11 to both the left and right ends thereof with a sufficient amount of light without causing unevenness in the illumination. Therefore, there is no need to use a diffusing agent for diffusing light over the illumination surface 11 and the light guide part, and the illumination surface 11 is not illuminated with the whitish somber color. Further, the cost can be reduced.

OTHER EXAMPLE EMBODIMENTS

In the above-described example embodiment, as shown in FIGS. 2A to 2C, the illumination surface 11 has a flat planar shape. However, in this example embodiment, slits are formed in the illumination surface in order to enable the illumination surface to be clearly and brightly illuminated. Note that in order to make it possible to form an enormous lens part having a lateral length longer than that shown in FIGS. 2A to 2C (a light guide part that guides light to an illumination surface having a longer shape), a case where the central part and its nearby area of the illumination surface disposed so as to be opposed to the LED has a curved shape is shown.

Figure 5A:
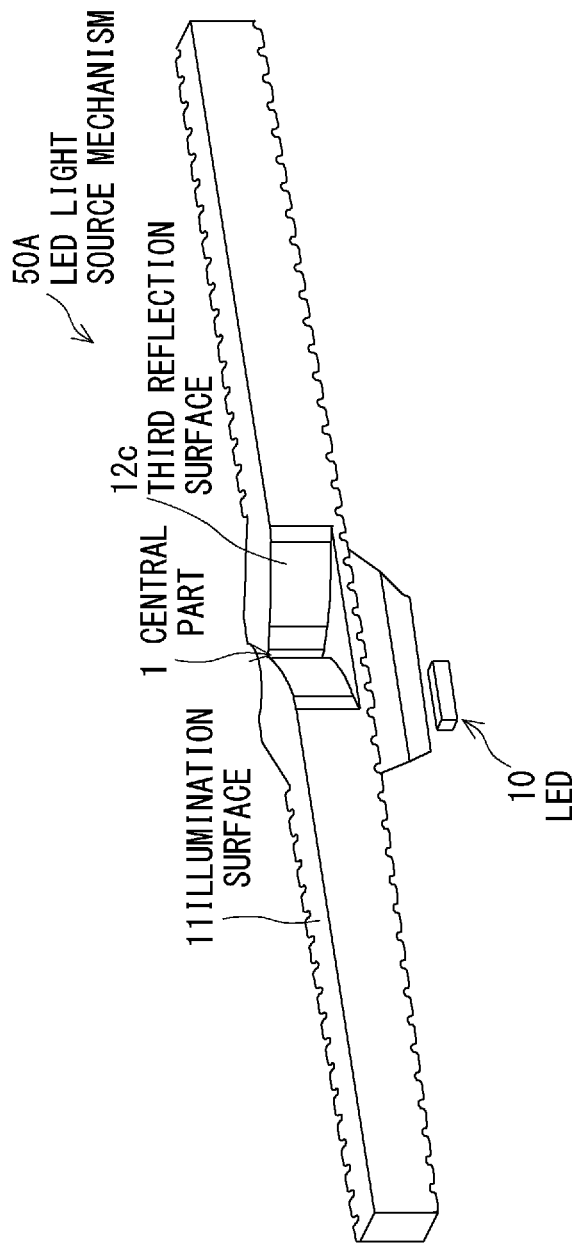
FIG. 5A is a schematic drawing showing a different example of the LED light source mechanism shown in FIGS. 2A to 2C.
Figure 5B:
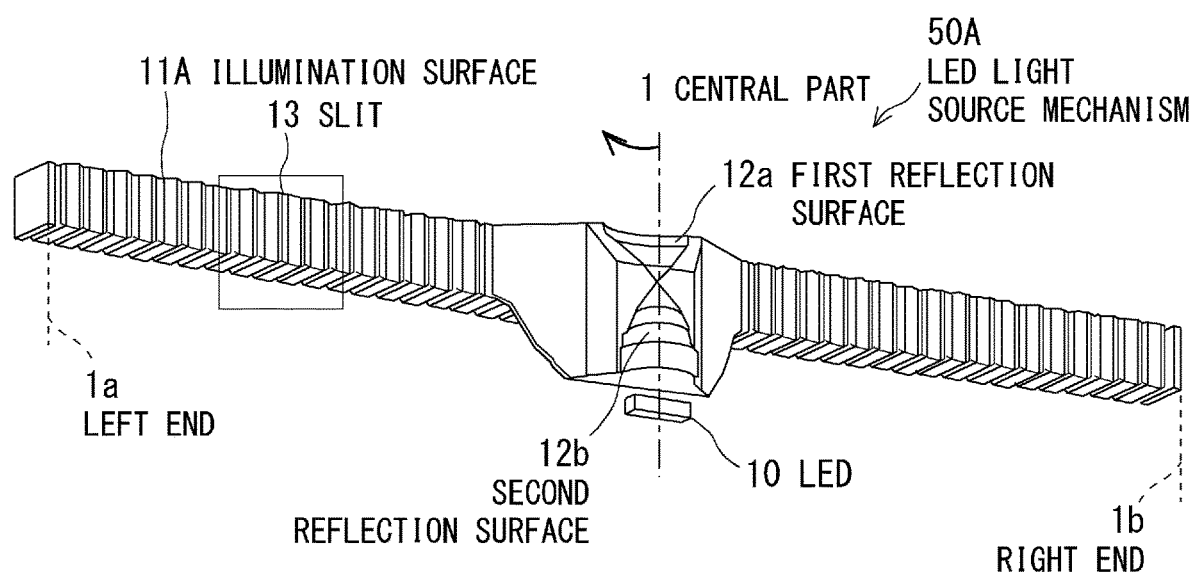
FIG. 5B is a schematic drawing showing the different example of the LED light source mechanism shown in FIGS. 2A to 2C.
Figure 5C:
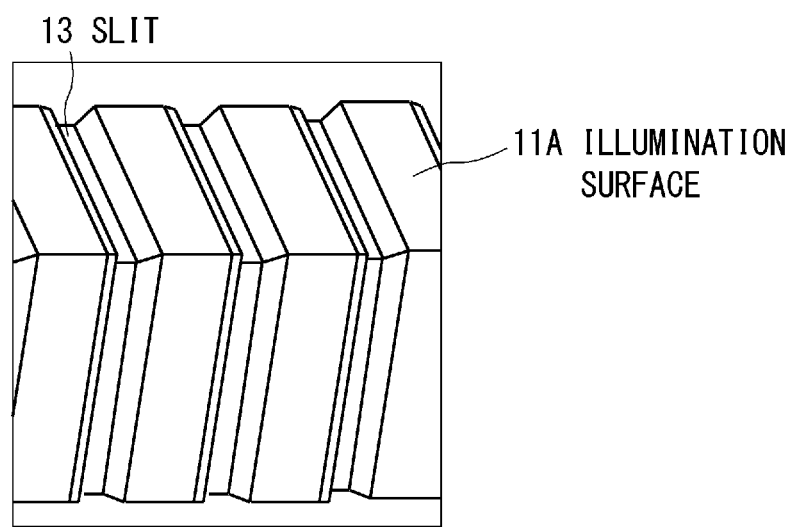
FIG. 5C is a schematic drawing showing the different example of the LED light source mechanism shown in FIGS. 2A to 2C.

That is, FIGS. 5A to 5C are schematic drawings showing an example different from the LED light source mechanism 50 shown in FIGS. 2A to 2C, in which unlike the case shown in FIGS. 2A to 2C, the central part of the illumination surface disposed to be opposed to the LED has a curved shape and slits are formed between the central part of the illumination surface and both the left and right ends thereof. Note that FIG. 5A is a perspective view showing an example of the external appearance of the LED light source mechanism 50 A different from that shown in FIG. 2A, and FIG. 5B is a perspective view showing an example of the internal structure of the LED light source mechanism 50A different from that shown in FIG. 2B as viewed obliquely from the rear (from the rear side of the paper) in FIG. 5A in a perspective manner. Further, FIG. 5C is an enlarged perspective view of a part of an illumination surface 11A shown in FIG. 5B.

As shown in the drawing showing the external appearance of the LED light source mechanism 50A in FIG. 5A and the internal structure of the LED light source mechanism 50A shown in FIG. 5B, the shape of the area at and near the central part 1, which is opposed to the LED 10, of the illumination surface 11A is different from the planer shape shown in FIGS. 2A to 2C. That is, the area at and near the central part 1 has a curved shape in which it is curved in the same direction (from the front of FIG. 5A to the rear thereof) from both the left and right sides. Further, on a reflection surface forming plate (not shown) which is formed in side surface parts on the apex side of the curved shape, a second reflection surface 12b and a first reflection surface 12a are arranged so that they face the LED 10. Further, on a curved surface (side surface parts of the curved shape) on the side of the curved shape opposite to the side thereof on which the second reflection surface 12b and the first reflection surface 12a are disposed, a third reflection surface 12c is formed in a curved shape as an additional reflection surface forming part.

That is, the area at and near the central part 1 of the illumination surface 11A is formed in a curved shape in which reflection surfaces having conical shapes (the second reflection surface 12b and the first reflection surface 12a) are disposed at the position of the apex of the curved shape in which it is curved in the same direction from both the left and right sides in such a manner that the reflection surfaces having the conical shapes face the LED 10. Further, a third reflection surface 12c having a curved shape is further formed on the curved surface on the side opposite to the position of the apex where the reflection surfaces having the conical shapes are disposed.

By further forming the third reflection surface 12c as described above, it is possible to make light emitted from the LED 10 further reflected in the left/right direction (the lateral direction) by the third reflection surface 12c and thereby to guide the light over a length longer than in the case shown in FIGS. 2A to 2C in both the left and right directions (the lateral direction) shown in FIGS. 5A to 5C through the light guide part (the lens). Therefore, even when the illumination surface 11A has a laterally long shape longer than in the case shown in FIGS. 2A to 2C, it is possible to make light reach both ends, i.e., the left and right ends 1a and 1b which is located deeper than in the case shown in FIGS. 2A to 2C and thereby to uniformly illuminate the entire area of the illumination surface 11A. In this way, it is possible, by forming an enormous lens as the light guiding part, to form a LED light source mechanism 50A including a wide illumination part 11A laterally linger than that shown in FIGS. 2A to 2C.

Further, as shown in the internal structure shown in FIG. 5B and the enlarged view shown in FIG. 5C, a plurality of slits 13 are formed between the central part 1 of the illumination surface 11A and the left and right ends 1a and 1b thereof at appropriate intervals according to the wavelength of light emitted from the LED 10 and at substantially equal intervals. As a result, it is possible to make, by light that reaches the slits 13 formed in the illumination surface 11A, light interfere with each other on the illumination surface 11A, and thereby to make the illumination surface 11A clearly and brightly illuminated. Therefore, when the LED 10 emits light, a large area on the illumination surface 11A is brightly illuminated, thus making it possible to improve the visibility by a user. Further, in this example embodiment, similarly to the previously-described example embodiment, there is no need to use a diffusing agent for the material for the illumination surface 11A and the light guiding part. Therefore, when the illumination surface 11A is illuminated, it is not illuminated with the whitish somber color. That is, it is possible to illuminate the illumination surface 11A in a brightly and clearly illuminated state.

Note that the formation of the slits 13 in the illumination surface 11A is not limited to the case where a laterally long enormous illumination surface 11A (an enormous lens) is formed as in the case shown in FIGS. 5A to 5C. That is, needless to say, they may be formed in the incoming-call illumination panel 15 of the key telephone 100 shown in FIG. 1, or in the illumination surface 11 of the LED light source mechanism 50 shown in FIGS. 2A to 2C. Further, as long as the visibility by a user can be ensured, an appropriate number of slits 13 may be formed between the central part of the illumination surface and both the right and left ends thereof, instead of forming the slits 13 over substantially the entire area from the central part 1 of the illumination surface 11A to the left and right ends 1a and 1b thereof.

Configurations of preferable example embodiments according to the present invention have been explained above. However, it should be noted that the above-shown example embodiments are merely examples of the present invention and thus do not limit the present invention. It will be understood by those of ordinary skill in the art that various changes in form and details may be made to the example embodiments without departing from the spirit and scope of the present invention.

That is, although the present invention is explained above with reference to example embodiments, the present invention is not limited to the above-described example embodiments. Various modifications that can be understood by those skilled in the art can be made to the configuration and details of the present invention within the scope of the invention.

REFERENCE SIGNS LIST

1 CENTRAL PART
1a LEFT END
1b RIGHT END
2 CENTER LIGHT RAY
2a LEFT-END LIGHT RAY
10 LED
11 ILLUMINATION SURFACE
11A ILLUMINATION SURFACE
11B ILLUMINATION SURFACE
12A REFLECTION SURFACE FORMING PLATE
12B REFLECTION SURFACE
12a FIRST REFLECTION SURFACE
12b SECOND REFLECTION SURFACE
12c THIRD REFLECTION SURFACE
13 SLIT
14 INCOMING-CALL LAMP
15 INCOMING-CALL ILLUMINATION PANEL
19 LIQUID CRYSTAL PANEL
21 LINE BUTTONS
31 DIAL BUTTON
32 FUNCTION BUTTON
50 LED LIGHT SOURCE MECHANISM
50A LED LIGHT SOURCE MECHANISM
50B LED LIGHT SOURCE MECHANISM
100 KEY TELEPHONE SET
100B KEY TELEPHONE SET
110 DISPLAY UNIT
110B DISPLAY UNIT
120 LINE BUTTON UNIT
130 DIAL UNIT
140 LOUDSPEAKER
150 MICROPHONE
200 TELEPHONE SET MAIN BODY
200B TELEPHONE SET MAIN BODY
210 LINE CABLE
300 HANDSET
310 SPIRAL CABLE

The invention claimed is:

1. An LED light source mechanism configured to use one LED (Light Emitting Diode) as a light source and illuminate an illumination surface, the illumination surface being laterally long and wide in a left/right direction, wherein,
a central axis of the LED is disposed at a position on a center line vertically extending from a central part in the left-right direction of the illumination surface in such a manner that the LED faces the illumination surface,
the LED light source mechanism has two reflection surfaces that are formed in a conical shape, the two reflection surfaces being configured to reflect light that is emitted from the LED toward an outside of the illumination surface,
a center line of the conical shape is disposed on the central axis of the LED,
the two reflection surfaces are:
a first reflection surface having a conical shape and configured to reflect light from the LED on an outer-surface side thereof; and
a second reflection surface having a truncated-conical shape, the second reflection surface including openings for light on both upper and lower surfaces thereof and configured to reflect light from the LED on an inner-surface side thereof, and
an inner-surface side of the first reflection surface and the inner-surface side of the second reflection surface are disposed to be opposed to each other around the central axis of the LED.

2. The LED light source mechanism according to claim 1, wherein
an area at and near the central part of the illumination surface has a curved shape in which the two reflection surfaces having the conical shape are disposed at a position of an apex of the curved shape in which it is curved in the same direction from both the left and right sides in such a manner that the two reflection surfaces face the LED, and
a third reflection surface having a curved shape is further formed on a curved surface on a side opposite to a side on which the two reflection surfaces having the conical shape are disposed.

3. The LED light source mechanism according to claim 2, wherein a plurality of slits are formed between the central part of the illumination surface and both right and left ends thereof at intervals corresponding to a wavelength of light emitted from the LED.

4. A telephone set comprising a laterally long and wide horizontal incoming-call illumination panel configured to be illuminated when a telephone call is received, wherein
the incoming-call illumination panel is formed by the LED light source mechanism according to claim 3.

5. A telephone set comprising a laterally long and wide horizontal incoming-call illumination panel configured to be illuminated when a telephone call is received, wherein
the incoming-call illumination panel is formed by the LED light source mechanism according to claim 2.

6. The LED light source mechanism according to claim 1, wherein a plurality of slits are formed between the central part of the illumination surface and both right and left ends thereof at intervals corresponding to a wavelength of light emitted from the LED.

7. A telephone set comprising a laterally long and wide horizontal incoming-call illumination panel configured to be illuminated when a telephone call is received, wherein the incoming-call illumination panel is formed by the LED light source mechanism according to claim 6.

8. The LED light source mechanism according to claim 1, wherein a material containing no diffusing agent for diffusing light is used for the illumination surface and a light guide part configured to guide light emitted from the LED to the illumination surface.

9. A telephone set comprising a laterally long and wide horizontal incoming-call illumination panel configured to be illuminated when a telephone call is received, wherein
the incoming-call illumination panel is formed by the LED light source mechanism according to claim 8.

10. A telephone set comprising a laterally long and wide horizontal incoming-call illumination panel configured to be illuminated when a telephone call is received, wherein
the incoming-call illumination panel is formed by the LED light source mechanism according to claim 1.

11. A method for forming an LED light source, the LED light source being configured to use one LED (Light Emitting Diode) as a light source and illuminate an illumination surface, the illumination surface being laterally long and wide in a left/right direction, wherein,
a central axis of the LED is disposed at a position on a center line vertically extending from a central part in the left-right direction of the illumination surface in such a manner that the LED faces the illumination surface,
the LED light source mechanism has two reflection surfaces that are formed in a conical shape, the two reflection surfaces being configured to reflect light that is emitted from the LED toward an outside of the illumination surface,
a center line of the conical shape is disposed on the central axis of the LED,
the two reflection surfaces are:
a first reflection surface having a conical shape and configured to reflect light from the LED on an outer-surface side thereof; and
a second reflection surface having a truncated-conical shape, the second reflection surface including openings for light on both upper and lower surfaces thereof and configured to reflect light from the LED on an inner-surface side thereof, and
an inner-surface side of the first reflection surface and the inner-surface side of the second reflection surface are disposed to be opposed to each other around the central axis of the LED.

12. The method for forming an LED light source according to claim 11, wherein
an area at and near the central part of the illumination surface has a curved shape in which the two reflection surfaces having the conical shape are disposed at a position of an apex of the curved shape in which it is curved in the same direction from both the left and right sides in such a manner that the two reflection surfaces face the LED, and
a third reflection surface having a curved shape is further formed on a curved surface on a side opposite to a side on which the two reflection surfaces having the conical shape are disposed.

13. The method for forming an LED light source according to claim 11, wherein a plurality of slits are formed between the central part of the illumination surface and both right and left ends thereof at intervals corresponding to a wavelength of light emitted from the LED.

14. The method for forming an LED light source according to claim 12, wherein a plurality of slits are formed between the central part of the illumination surface and both right and left ends thereof at intervals corresponding to a wavelength of light emitted from the LED.

15. The method for forming an LED light source according to claim 11, wherein a material containing no diffusing agent for diffusing light is used for the illumination surface and a light guide part configured to guide light emitted from the LED to the illumination surface.

* * * * *